G. H. SETHMAN.
MEANS FOR PRODUCING ELECTRICAL CURRENTS AND IMPULSES.
APPLICATION FILED OCT. 26, 1914.
1,319,181.
Patented Oct. 21, 1919.
6 SHEETS—SHEET 1.
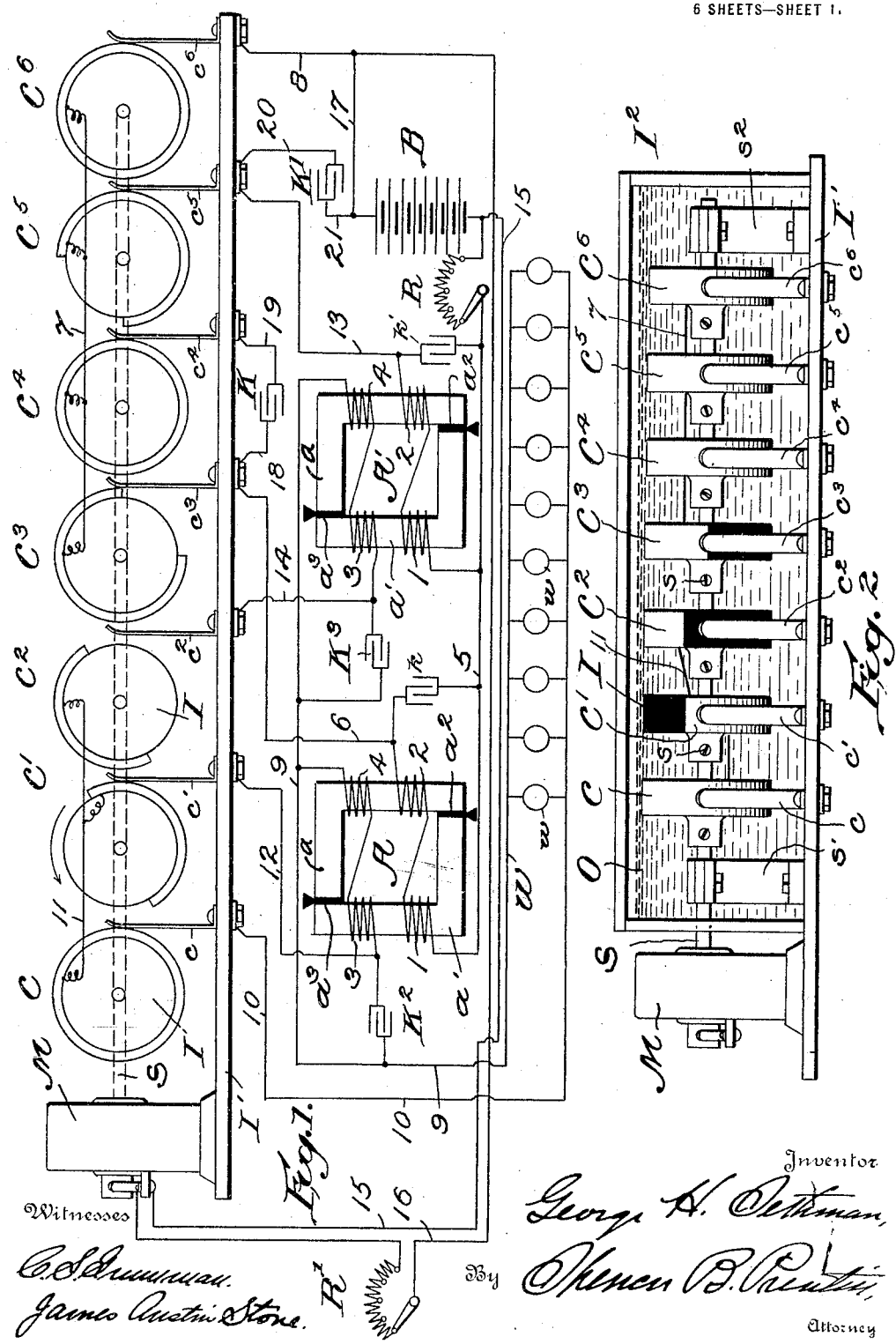
Witnesses
C. S. Dunnuau.
James Austin Stone.
Inventor
George H. Sethman,
By Spencer B. Prentiss
Attorney

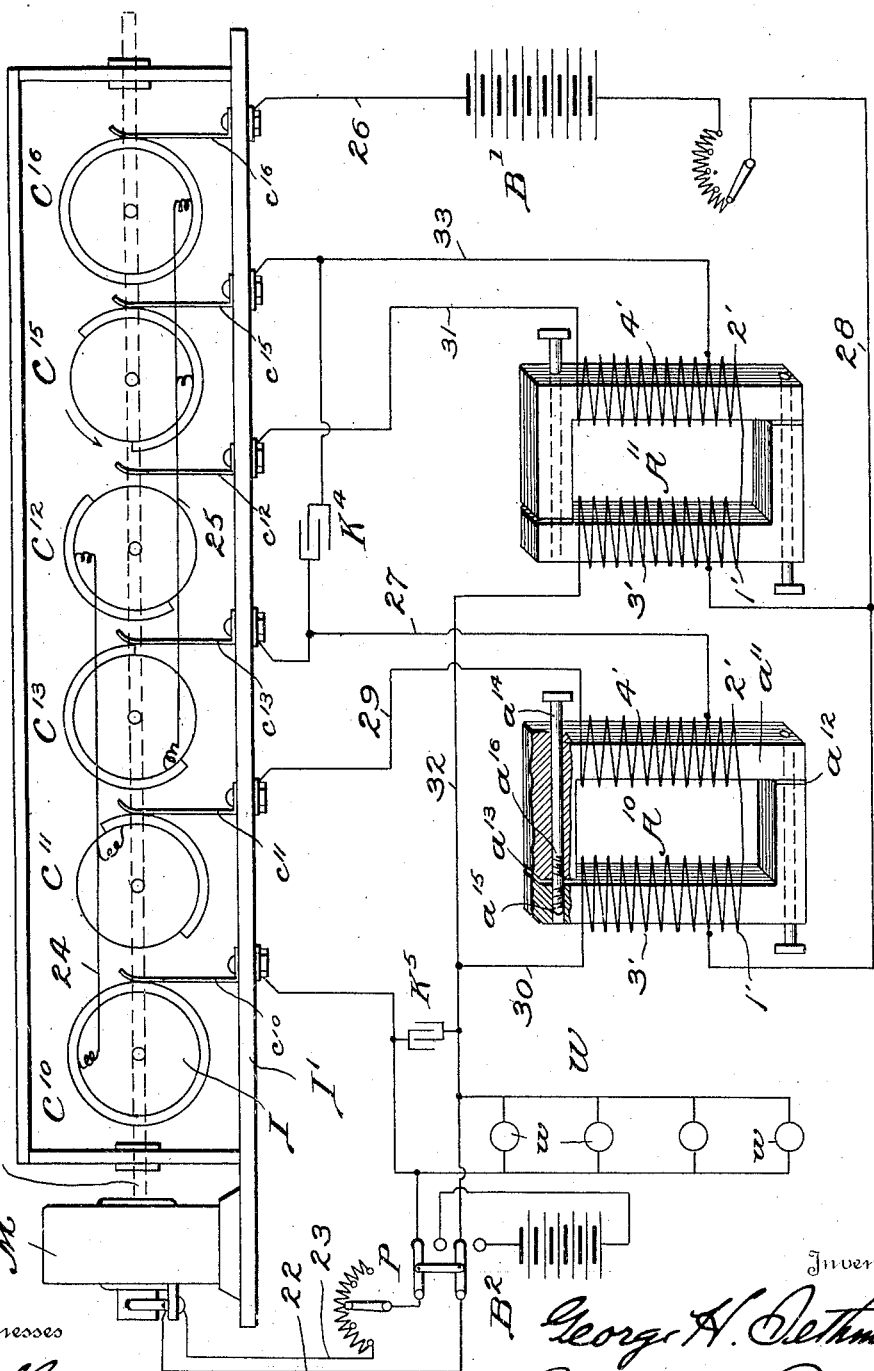

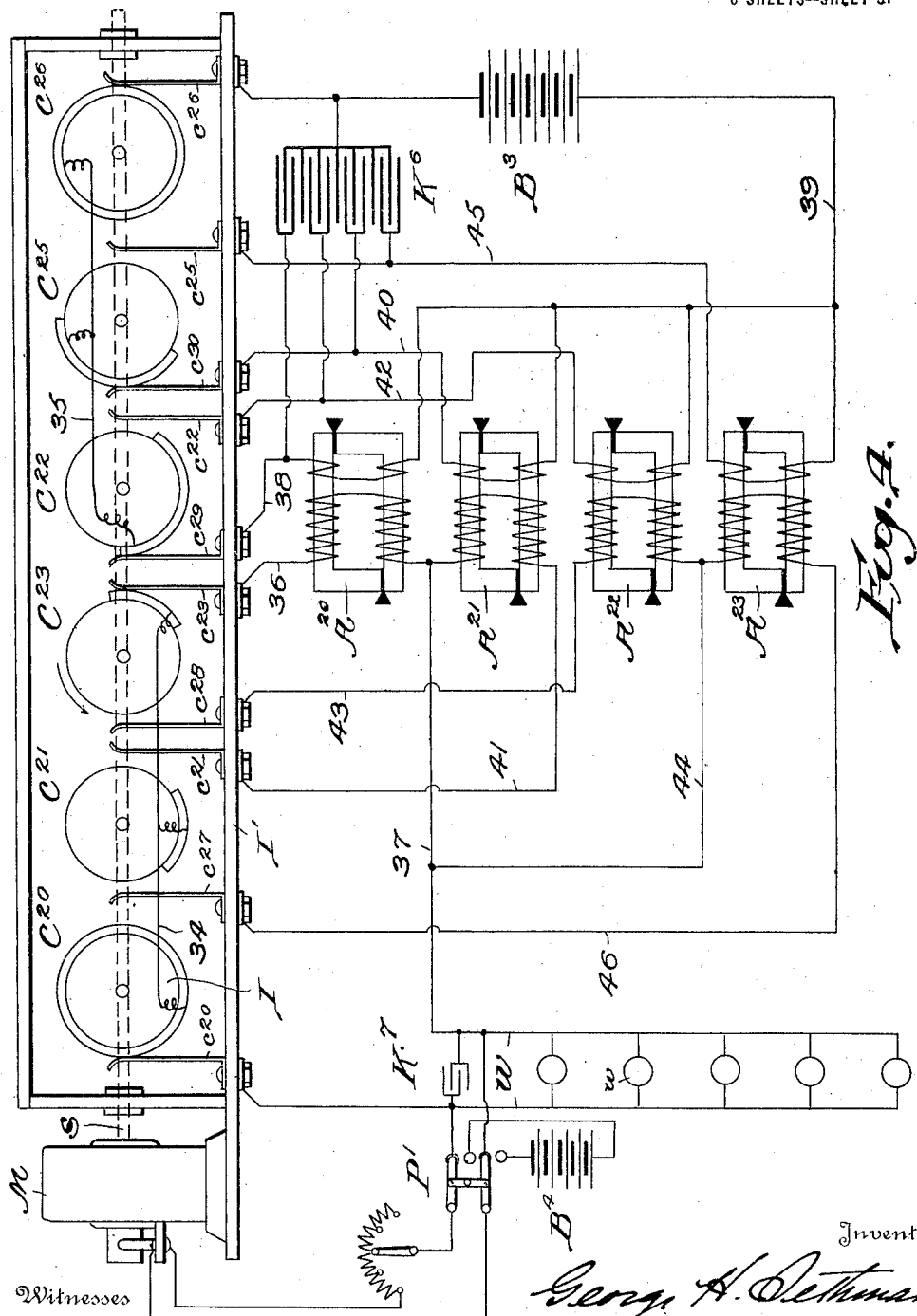

G. H. SETHMAN.
MEANS FOR PRODUCING ELECTRICAL CURRENTS AND IMPULSES.
APPLICATION FILED OCT. 26, 1914.
1,319,181.
Patented Oct. 21, 1919.
6 SHEETS—SHEET 4.
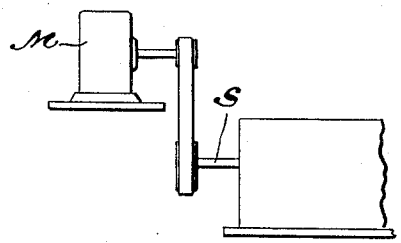
Fig. 7ª
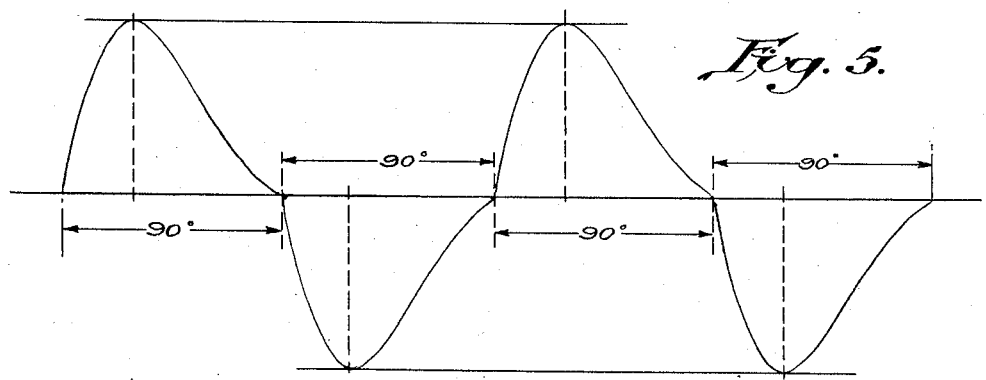
Fig. 5.
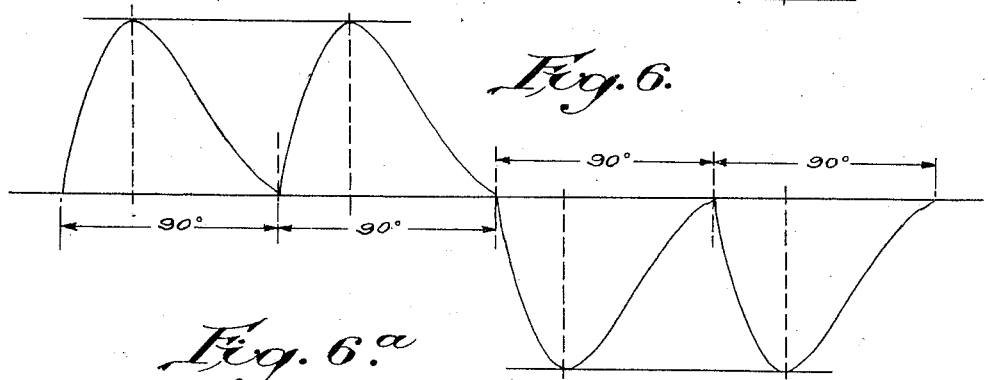
Fig. 6.
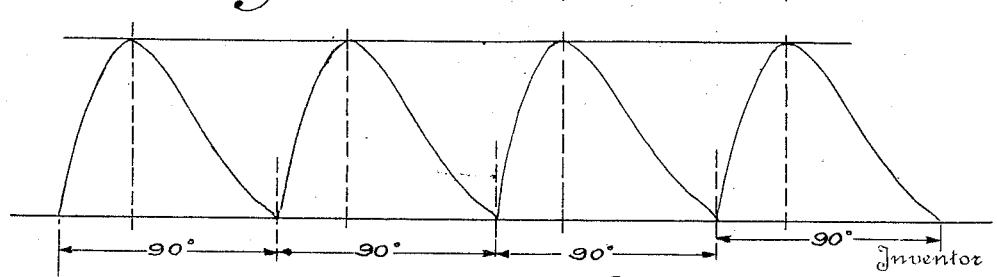
Fig. 6ª
Witnesses
Inventor
George H. Sethman
By
Attorney G. H. SETHMAN.
MEANS FOR PRODUCING ELECTRICAL CURRENTS AND IMPULSES.
APPLICATION FILED OCT. 26, 1914.

1,319,181.   Patented Oct. 21, 1919.
6 SHEETS—SHEET 5.

Inventor
George H. Sethman,
By Spencer B. Prenter,
Attorney

Witnesses

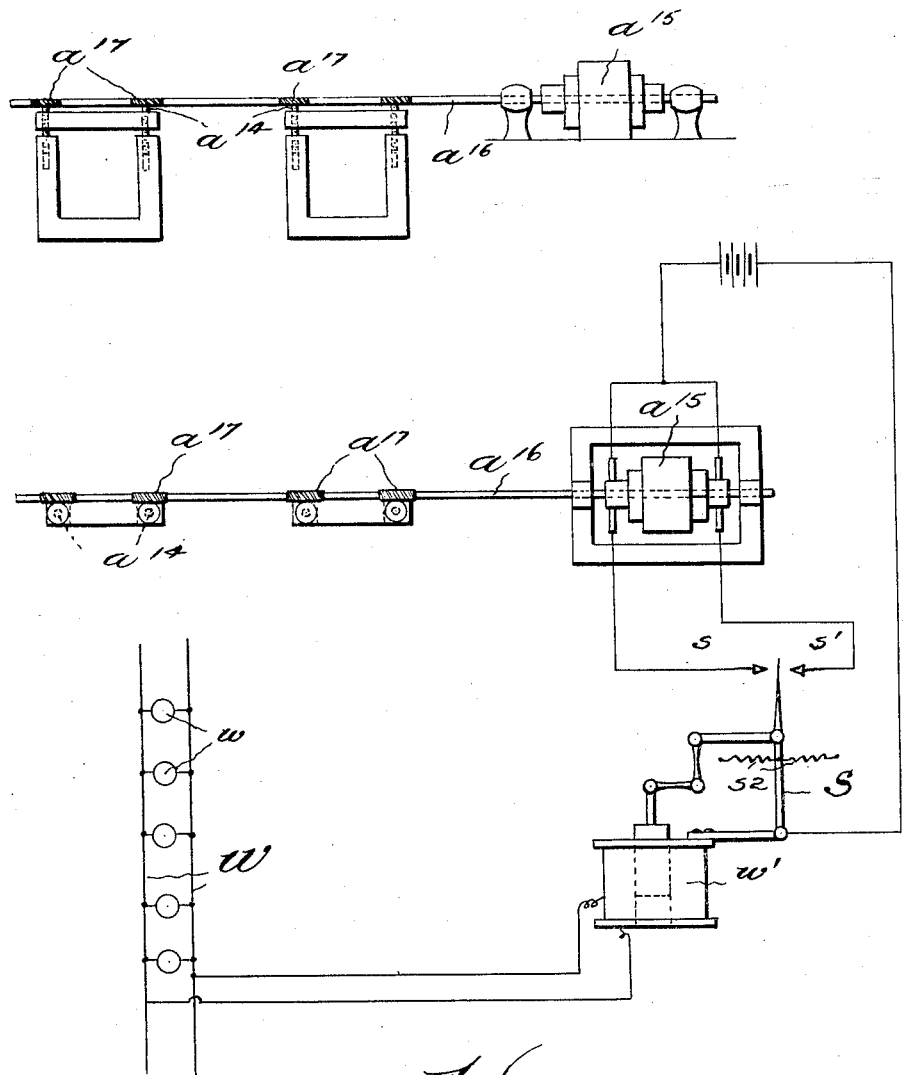

UNITED STATES PATENT OFFICE.

GEORGE H. SETHMAN, OF DENVER, COLORADO, ASSIGNOR, BY DIRECT AND MESNE ASSIGNMENTS, OF THREE-TWENTIETHS TO WILLIAM H. FERGUSON AND SEVEN-TWENTIETHS TO WILLIAM E. PORTER, BOTH OF DENVER, COLORADO.

MEANS FOR PRODUCING ELECTRICAL CURRENTS AND IMPULSES.

1,319,181.     Specification of Letters Patent.     Patented Oct. 21, 1919.

Application filed October 26, 1914. Serial No. 868,583.

*To all whom it may concern:*

Be it known that I, GEORGE H. SETHMAN, a citizen of the United States, residing at Denver, in the county of Denver and State of Colorado, have invented new and useful Improvements in Means for Producing Electrical Currents and Impulses, of which the following is a specification.

My invention relates to the production of electrical currents and impulses, and has for its objects: the provision of a combination of apparatus and circuits for producing electrical currents and impulses which will be practically useful in certain applications and in connection with certain translating devices, whereby improved useful effects in such applications are obtained; the production of electrical currents or impulses suitable for commercial incandescent electric lighting, without the use of relatively moving dynamic parts or elements by which said currents or impulses are produced. These and other objects will more fully appear hereinafter.

For the purpose of explaining and illustrating the invention, I will describe an embodiment thereof especially adapted to produce electrical currents or impulses for use in incandescent electric lighting, but it will be understood that these currents or impulses may be useful for other translating devices and purposes, and that the invention is capable of other embodiments.

My invention contemplates the production of the desired currents or impulses by means of one or more units of induction apparatus in which magnetic lines of force are built up through a complete or substantially complete magnetic circuit and core of high magnetic permeability, and makes use of the currents or impulses induced by the contraction only of such lines of force, without any attempt to utilize the currents and impulses induced by the building up or production of the same lines of force. The contraction of the lines of force is caused by a break in the electrical energizing circuit resulting in an interruption of the current which produced said lines of force, and in order to cause this contraction of the lines of force to be instantaneous or nearly so, I immerse the contacts at the break in oil, which shortens the arc, and I also provide the magnetic circuit with a small gap or gaps to cause the proper degree of magnetic reluctance. The contraction of the lines of force is further accelerated by connecting a condenser across the break to assist in extinguishing the arc, the condenser moreover being designed to provide a capacity sufficient to neutralize the self-induction of the coil or coils and to reinforce the currents or impulses delivered to the work circuit, as hereinafter more fully described. The impulses so generated are delivered to the work circuit in rapid succession, either in the same direction or in alternately opposite directions so as to constitute a practically continuous unidirectional current or an alternating current of the desired wave form, and of any required voltage and amperage.

The apparatus for carrying my invention into effect includes one or more transformer units, each having a core structure in which the magnetic circuit is complete except for one or more short gaps, and upon which core structure are wound or placed primary energizing or field coils connected with a suitable source of electrical current, the circuit of each of the field coils containing a make and break device whereby the circuits are successively made and broken at predetermined intervals. Upon the same core structure are wound or placed one or more secondary or armature coils in which are set up the induced currents resulting from the contraction of the magnetic lines of force caused by the breaking of the flow of current in the exciting or field coils. These armature coils are each connected with the common external work circuit which supplies electricity or current for electric lights, power, or other purpose, as may be required. Provision is made, through the instrumentality of suitable make and break devices, for successively making and breaking the circuits through the field and armature windings of the respective generating units.

In order to cause the lines of force generated by the field coil or coils to drop to zero with sufficient rapidity to produce the proper inductive effect, I employ a core structure built up of iron or steel or other magnetic material and having a complete magnetic circuit with a small gap or gaps offering an amount of reluctance sufficient to bring about a quicker action through the armature coil on the breaking of the field circuit. In the field coil the current from battery, small direct current generator or other suitable source of current, when the circuit is closed through the field winding, builds up the lines of force gradually owing to the self-induction, and the generative effect upon the armature circuit if it were closed would therefore be very small and of ordinary low efficiency. I therefore utilize only the effect on the armature coils of the contraction of the lines of force caused by the breaking of the field circuit, and by sending these impulses to line in quick succession I obtain pulsating and practically continuous direct current, or an alternating current of the single phase or polyphase type, having any wave form, depending upon the design and number of field and armature circuits and the connections and the timing of the makes and breaks of each.

It will thus be seen that my apparatus depends for its action, not upon the movement of a conductor or coil through magnetic lines of force, but upon the extremely rapid movement or contraction of already built up magnetic lines of force through or past a conductor or coil.

In order to assist in causing the lines of force to drop to zero with the greatest possible rapidity I provide for the breaking of the energizing circuit instantaneously, or as nearly so as practicable, by eliminating or greatly reducing the spark at the break. This is accomplished by connecting a condenser or its equivalent across the break, or immersing the contacts in oil or an equivalent capable of accelerating the elimination of the arc and protecting the points of contact, or both, or by any other suitable means. The condenser across the break in the field circuit is designed with sufficient capacity to serve the additional purpose of preventing or forestalling the effects of self-induction by neutralizing or counter-balancing the counter-electromotive-force, which would otherwise be set up in the field and armature circuits, and thus reinforces by its discharge the impulses sent to line in the work circuit. An additional condenser may likewise be introduced into the armature circuit with sufficient capacity to neutralize or counterbalance any undesirable effects of self-induction not already overcome by the condenser across the field circuit, and to further reinforce the successive impulses delivered to the work circuit. The capacities of the condensers above mentioned are balanced against the counter-electromotive-force set up by self-induction of the coils and the load on the work circuit and may readily be determined either by actual test or be mathematically computed when the counter electromotive-force is known or has been determined by the use of existing formulæ.

My invention consists, therefore, in the design, construction, combination and operation of apparatus and parts thereof with the circuit connections, all as above indicated and hereinafter more fully described.

The parts of the invention will be first illustrated by diagrammatic views, and the operation and complete diagram of circuits will then be described.

The invention is illustrated in the accompanying drawings, in which—

Figure 1 is a diagrammatic view of one form and arrangement of apparatus and circuits, the movable member of the contact devices being shown facing at 90° from their actual positions;

Fig. 1$^a$ is a detail showing the motor geared to the contact device shaft instead of being directly connected;

Fig. 2 is a section through the contact-containing case, showing the contact devices in side elevation;

Fig. 3 is a diagrammatic view of a modification, the magnetic structures of induction or transformer units being shown in perspective;

Fig. 4 is a diagrammatic view of a complete arrangement of apparatus and circuits for a two-wire work circuit;

Figure 7:
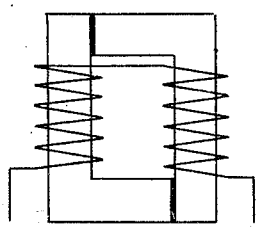
Figure 8:
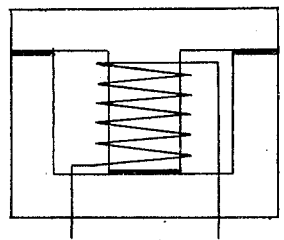
Figure 9:
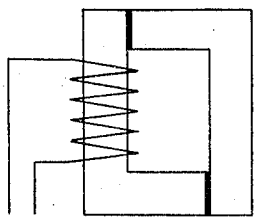
Figure 10:
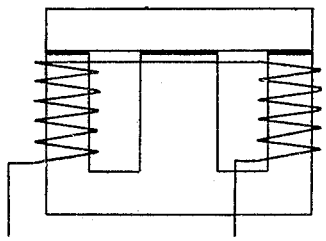
Figure 11:
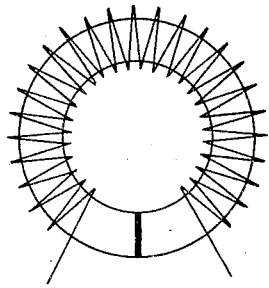
Figure 12:
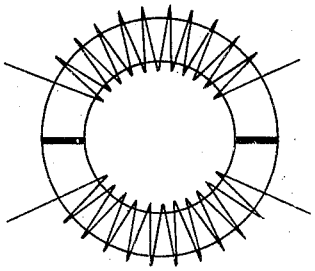
Figure 13:
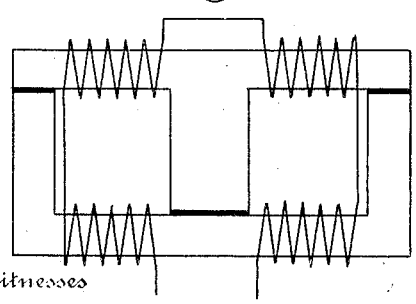
Figure 14:
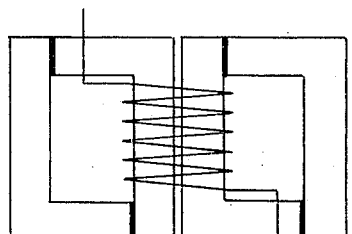

Figs. 5, 6 and 6$^a$ are diagrams of current waves;

Figs. 7 to 14 show diagrammatically various forms of core structures with diagrammatic windings which may be used;

Figs. 15 and 16 show diagrammatically a mode of automatically adjusting the core gaps of the apparatus.

Throughout this specification and claims the term "transformer unit" or "induction unit" is employed to indicate the unit of the apparatus in which the desired currents or impulses are produced by inductive action. In such units I use the terms "primary", "energizing" and "field" indiscriminately to indicate the circuits and coils of the respective units through which the current flows to build up the magnetic lines of force, and I use the terms "secondary" and "armature" to indicate the circuits and coils in which the desired currents or impulses are produced or induced by the action of the contracting lines of force.

Referring first particularly to Fig. 1, A is a transformer unit preferably having a built up core, for instance, laminated and shown as formed in two parts $a$, $a^1$ to provide a complete magnetic circuit with two spaces or gaps $a^2$, $a^3$ shown as filled with non-magnetic insulating material. These gaps are preferably made adjustable, as indicated by small wedges, according to the ratio of input and output of the transformer unit, and this adjustability of the gap is of great importance for the reason that the reluctance created by separating the core, thus breaking the complete magnetic circuit, prevents oscillations or surgings of the lines of force when they are brought to zero, thus producing a contraction of the lines of force instantaneously, or nearly so. It is of importance to consider, with reference to the adjustable gaps, that when the transformer unit is producing a small amount of current in the armature coil circuit, and requiring but a small amount of field current to energize the core, the gaps need but little spacing, but as the load increases the gaps must likewise be increased because the energizing current is necessarily increased, bringing up a higher density of the lines of force, thus requiring greater reluctance to maintain a uniform potential or voltage or electromotive-force, as it may be called in the external circuit. For this reason the gaps should be made adjustable, and the regulation of the apparatus in practice may be accomplished by adjusting the gaps as well as controlling the energizing current. In practice the gaps may be automatically adjusted by a small regulating solenoid shown at $W^1$ in Fig. 16, in the work circuit, but manual means may be employed if preferred, and this will be supplemented by a regulating rheostat in the energizing circuit, as will be hereinafter more fully explained.

Transformer unit A is provided with field and armature windings, as shown in this figure these being separate coils. The field winding comprises coils 1 and 2, and the armature winding comprises coils 3 and 4. The field and armature windings may be wound upon separate parts of the core as shown, or they may be wound one over the other in any well known or preferred manner.

The field coils 1 and 2 of transformer unit A are connected in circuit with battery B, or other suitable source of current, preferably direct current, by conductors 5 and 6, contact device $C^3$ when in proper position and its brush $c^3$, conductor 7, contact device $C^6$, its brush $c^6$, conductors 8 and 17. The armature coils 3 and 4 of transformer unit A are connected with work circuit W, containing translating devices $w$, such as lamps, motors, etc., by conductors 9, 10, contact device C, its brush $c$, conductor 11, contact device $C^1$ when in proper position, its brush $c^1$, and conductor 12.

Transformer unit $A^1$, of construction similar to unit A, has its field coils 1 and 2 connected in circuit with battery B by conductors 5 and 13, contact device $C^5$ when in proper position, its brush $c^5$, wire 7, contact devices $C^6$, its brush $c^6$, and conductors 8 and 17. The armature coils 3 and 4 of unit $A^1$ are connected with work circuit W by conductors 9, 10, contact device C, its brush $c$, conductor 11, contact device $C^2$ when in proper position, its brush $c^2$, and conductor 14.

The contact devices, C, $C^1$, $C^2$, $C^3$, $C^4$, $C^5$ and $C^6$ are here shown of the rotating type mounted on shaft S or otherwise suitably arranged to be driven synchronously in a fixed relation to each other by any suitable means, such as an electric motor M connected directly, belted or geared to the shaft, which motor may be supplied with current from battery B through conductors 15, 16 and 17, or from some other source of current. Contact devices C, $C^1$, &c., are angularly displaced with respect to each other so as to close and open their respective circuits at the right moment. Shaft S may, when desired, be driven from any other source of power. In Fig. 1 the contact devices are shown as conducting surfaces mounted upon disks of insulation I, and turned around 90° upon the shaft so as to be seen from the side, the brushes $c$, $c^1$, $c^2$, $c^3$, $c^4$, $c^5$, $c^6$ being shown mounted upon base $I^1$ in position to engage the respective contact devices. Contact device $C^4$ might be omitted by connecting conductor 19 to conductor 13, as shown in Fig. 3, or to conductor 8. In Fig. 2 is shown one form of this portion of the apparatus as actually constructed, the respective disks of insulation I being given an outer diameter equal to the outer diameter or surface of the contact devices and secured to the shaft S by set screws $s$, so that adjustment may be made for timing the contact devices. The bearings $s^1$, $s^2$ of the shaft are mounted upon base $I^1$.

In order to assist in extinguishing the arcs formed when the field circuit is broken at certain of the contact devices, the contact devices are immersed in oil, as shown in Fig. 2, the bearings $s^1$, $s^2$ being placed within the walls of the containing case $I^2$, outside said case, or inside said case, as may be desired. The oil is shown at O.

Contact devices C, $C^1$ and $C^2$ are electrically connected by a conductor 11, preferably extending along in proximity to the shaft, and contact devices $C^3$, $C^4$, $C^5$ and $C^6$ are similarly connected by conductor 7.

The principal means for reducing arcing at the contact devices of the field circuits are condensers K, $K^1$ bridged respectively across the breaks. Condenser K is connected by conductor 18 with brush $c^3$ of contact device $C^3$, and to brush $c^4$ of contact device $C^4$ by conductor 19. Condenser $K^1$ is connected to brush $c^5$ of contact device $C^5$ by conductor 20, and to brush $c^6$ of contact device $C^6$ by conductors 21, 17 and 8. Also a condenser $K^2$ is shown in Fig. 1 connected across the terminals of armature winding 3—4 of unit A, and a separate condenser $K^3$ connected across the terminals of armature winding 3—4 of unit $A^1$. The action of these condensers, and their effect on currents flowing in the field and armature windings of the units will be fully considered hereinafter as I proceed with the description of the operation of the apparatus.

In order to regulate the flow of exciting current to the field coils of the transformer units, and thereby regulate the apparatus, I employ a rheostat R or other suitable regulating device in the energizing circuit which includes battery B. Of course when the exciting current is derived from a dynamo, the output of the latter may be controlled by varying its field excitation or by any other well known method.

The speed of the contact devices, which are shown as direct-connected to motor M, may be controlled by changing the speed of the motor by rheostat $R^1$, or by any other suitable means, and when, as for instance in some small machines, it is desirable to drive the contact devices at speeds lower than those of which the motor is economically capable, I gear the motor to shaft S by any suitable gearing such as shown in Fig. 1$^a$.

The apparatus as above described operates as follows:

The contact devices are supposed to be rotating at proper speed in the direction of the arrow shown in Fig. 1. In the position of the contact devices shown, the circuit of field coils 1 and 2 of transformer unit A is closed at contact device $C^3$, and the circuit of field coils 1 and 2 of transformer unit $A^1$ is closed at contact device $C^5$, as above indicated, and contact device $C^3$ is about to pass out of engagement with its brush $c^3$. The circuit of armature coils 3 and 4 of unit $A^1$ is open at contact device $C^2$, which is out of engagement with its brush $c^2$, and the circuit of armature coils 3 and 4 of unit A is closed at contact device $C^1$.

Considering first unit A, while the current is passing through the field coils, magnetic lines of force are produced in the iron or steel core, around which coils 1 and 2 are wound, the number of lines of force depending upon the amount of iron or steel in the core, the quality of the material making up said core and extent of the core gap, and the amount of current flowing through coils 1 and 2. These magnetic lines of force are threaded through armature windings 3 and 4 of the unit, but as long as the current in the field windings remains steady and unchanged no current will flow in the armature windings. When, however, contact device $C^3$ leaves its brush $c^3$, the circuit including source of current B and the field coils of unit A is broken at that point very quickly. At the instant of break, an arc tends to develop between the two contacts, which arc, if not eliminated instantly, would permit the lines of force already generated in said core to diminish slowly and materially reduce the effect hereinafter stated.

To reduce the arcing at the point of break is one of the functions of the condenser employed. When, therefore, contact device $C^3$ leaves its brush $c^3$, one side of the field circuit from source of current B will discharge through field coils 1 and 2 of unit A and conductor 6 into condenser K, and the other side of said circuit will discharge through conductors 17, 8, brush $c^6$, contact device $C^6$, conductor 7, contact device $C^4$, brush $c^4$, and conductor 19 to the other side of condenser K. The arc at the point of break is thus eliminated or reduced to such a degree that the lines of force maintained by the field circuit drop suddenly to zero. This drop or movement of the lines of force takes place through armature windings 3—4 of the unit, which, by the operation called "contracting lines of magnetic force", produces or induces in said armature winding a current or impulse of a value depending upon the size of the wire making up the coil, the number of turns wound around the core, and upon the cross-sectional area of the core, together with its permeability.

The condensers K and $K^1$ are also designed with sufficient capacity to neutralize the self-induction set up in both the field and the armature circuits.

The currents or impulses induced in armature coils 3 and 4 pass through conductor 9, work circuit W, conductor 10, brush $c$, contact device C, conductor 11, contact device $C^1$, brush $c^1$, with which the latter had made engagement just prior to the breaking of the field circuit, and conductor 12. It will thus be seen that the armature coils 3—4 constitute the induction element, and the magnetic lines of force, when receding in the core, produce the currents in the armature coils.

All that has been said with reference to transformer unit A and its coöperating apparatus and circuits applies as well to unit $A^1$ and its coöperating apparatus and circuits. It will be observed, however, that the timing of the contact devices is such that when unit A is delivering its current to the work circuit through contact device $C^1$, the armature circuit of unit $A^1$ is open at contact device $C^2$. The two contact disks $C^1$ and $C^2$ work alternately and make contact alternately with the external work circuit at the points of the revolution when contact devices $C^3$ and $C^5$ make and break the field circuits of the respective units.

It is not necessary to have more than one unit and one set of coils with their respective contact devices to make and break the field and armature circuits, but as this apparatus depends upon the exciting current bringing up the density of the magnetic lines of force to the desired point, a short period of time is required to do so economically. By this procedure the external work circuit would receive only a pulsation form of current, which would be more than noticeable in a system of lighting. By employing an additional unit making two in number, as shown in Fig. 1, a longer time is given, with the same number of revolutions of the contact devices, to generate the initial magnetic lines of force. Even with two units there results a pulsation and consequent noticeable fluctuation in lamps connected in circuit, but I have selected this number for the purpose of demonstrating and explaining the invention and by this arrangement good results are obtained.

It will be understood, however, that the invention is not limited to any particular number of units and contact devices. By employing three or more units, with a suitable number of additional contact devices, and cutting and timing the contact devices accordingly so that the make and break of the respective circuits come in the same succession, the pulsations of current, while still existing in the external circuit, will become so rapid, under the same number of revolutions, that they are not noticeable to the eye in lighting lamps, and motors and other electrical devices work successfully. It is obvious that, in the same manner, a larger number of units than three may be employed with a corresponding number of contact devices. One such combination and arrangement employing four units will be hereinafter described.

Referring again to Fig. 1, it will be observed that, the respective coils of the units being similarly wound, when the field circuits of the respective units are closed the current from source B will flow in the same direction, and consequently when said field circuits are broken, as above described, the current induced in each of the armature circuits and sent to line will be in the same direction. If, however, the connections of the field or armature windings of one unit be reversed, the current induced will be that of two complete pulsations, each in a direction opposite to the other, forming what is known as a complete cycle of two alternations. The forms of the various current waves will be hereinafter indicated.

It has already been said that I make use of the current induced by the contracting lines of magnetic force only, when the field circuit is broken, and disregard that induced by the building up of the magnetic lines of force when the field circuit is closed. The contact devices are therefore designed to send to line only impulses induced on the breaking of the field circuit. It will be found under some conditions however that after a field circuit has been broken for the purpose of causing the contraction of the magnetic lines of force, the armature windings being connected to line, the field circuit may be again closed before the armature windings are disconnected from the line. For instance, such an arrangement is shown in Fig. 1 of the drawings, where it will be seen that after a field circuit has been broken by contact device $C^3$ or $C^5$, it is again closed before armature circuit is opened at contact devices $C^1$, $C^2$ respectively, but this action may be disregarded and is of no consequence because the self-induction of the field windings creates a counter-electromotive-force to that of source of current B, and the lines of force are brought up gradually to maximum, giving but few volts in the external circuit. In other words, when direct current is applied to a transformer unit of this kind, the magnetic lines of force are not built up as quickly as they subside when the circuit is broken, and unless a core is designed with an amount of reluctance so large as to diminish the number of lines produced, the induced impulse resulting from the building up of the lines of force is inappreciable and the diminution in number of lines of force would seriously impair the current induced by their subsidence.

Any self-induction in the field and armature coils not already neutralized by condensers K and $K^1$ is completely neutralized or eliminated by the introduction of condensers $K^2$ and $K^3$ bridged across the armature or work circuits.

Additional features of the invention are shown in Fig. 3 of the drawings, and these, together with their objects and operation, will now be described.

It will be observed that in this organization, contact device $C^4$ of Fig. 1 has been omitted as superfluous, and a single condenser $K^4$ is employed to bridge the breaks in both field circuits, performing the same functions of condensers K and $K^1$. Also, a single condenser $K^5$ is bridged across the armature or work circuit, and performs the functions of condensers $K^2$ and $K^3$. The segments of contact devices $C^{11}$, $C^{12}$, $C^{13}$ and $C^{15}$ are cut or proportioned so that the armature circuits are always open at the time of closing the field circuits.

Motor M, in this case, is connected to be started on current from battery $B^2$, of suitable voltage and to operate on current delivered to the work circuit after starting the apparatus.

In Fig. 3 also is shown a specific means for adjusting the gaps $a^{12}$, $a^{13}$ of the cores $a^{11}$, $a^{14}$ having reverse threads $a^{15}$, $a^{16}$ engaging the respective core sections. The operation of these rods $a^{14}$ may be either manual, or automatic in response to conditions or variations in the work circuit, for the purpose of adjustment or regulation. In this figure I have also shown the field and armature windings as directly connected instead of electrically separate as shown in Fig. 1. It will be understood that while these coils, the field and armature coils, are shown diagrammatically as placed upon different portions of the cores, in practice the armature coils are preferably wound over the field coils in the manner well known in connection with transformers. The automatic adjustment of the core gaps is shown in Figs. 15 and 16. In these figures each rod $a^{14}$ is shown operated by motor $a^{15}$ through shaft $a^{16}$ and worm gears $a^{17}$. The motor is controlled by switch arm S and coöperating contacts $s\ s^1$, said arm tending to remain in neutral position by the action of springs $s^2$. Switch arm S is adapted to be moved by solenoid $w^1$ connected to work circuit W, so that the motor is started, stopped and reversed to vary the core gaps automatically in response to conditions or variations in the work circuit. This may be accomplished in any other suitable way.

The operation of the apparatus as shown in Fig. 3 will be understood from the foregoing, but may be briefly explained as follows: With the parts in the positions shown, the armature circuit of unit $A^{10}$ is closed through contact device $C^{11}$, and that of unit $A^{11}$ is open at contact device $C^{12}$. The field circuit of unit $A^{11}$ has been closed at contact device $C^{15}$, so that the field of this unit is building up, and the circuit of unit $A^{10}$ is about to be broken at contact device $C^{13}$. The contact devices are started in any suitable manner, as by moving starting switch P to connect starting battery $B^2$ to motor circuit 22, 23, and as soon as the delivery of current to the work circuit has become sufficient, the switch may be moved back so as to operate the motor from the work circuit. When shaft S begins to turn, contact device $C^{13}$ breaks contact with its brush $c^{13}$, thus breaking circuit from battery $B^1$, wire 26, brush $c^{16}$, contact device $C^{16}$, wire 25, contact device $C^{13}$, brush $c^{13}$, wire 27, field coils 1' and 2' and wire 28. An impulse induced in armature coils 3', 4' is thus delivered to the work circuit, as follows: wire 29, brush $c^{11}$, contact device $C^{11}$, wire 24, contact device $C^{10}$, brush $c^{10}$ work circuit W, and wire 30 to armature coils 3', 4'. It will be observed that the field coils 1, 2 are also included in this latter circuit, and their connections may be brought in at any point along coils 3, 4 or may include the whole of said coils.

This circuit remains closed until contact device $C^{11}$ passes out of engagement with brush $c^{11}$, immediately after which contact device $C^{13}$ again engages brush $c^{13}$ and closes the circuit of field windings 1, 2. Immediately after contact device $C^{11}$ has opened the armature circuit of unit $A^{10}$, contact device $C^{12}$ closes the armature circuit of unit $A^{11}$, as follows: wire 31, brush $c^{12}$, contact device $C^{12}$, conductor 24, contact device $c^{10}$, work circuit W, and conductor 32. Some time before this the following field circuit of unit $A^{11}$ had been closed: battery $B^1$, conductor 26, brush $c^{16}$, contact device $C^{16}$ wire 25, contact device $C^{15}$, brush $c^{15}$, wire 33 field coils 1', 2' of unit $A^{11}$, and wire 28. In the continued movement of the contact devices, this latter circuit is next broken by contact device $C^{15}$, resulting in the same action as that described in connection with contact devices $C^{13}$ and $C^{11}$ and unit $A^{10}$. When the coils of the respective units are similarly wound and connected to the contact devices, the currents or impulses delivered to the work circuit will be in the same direction, but the windings or connections may be such as to produce an alternating current, as will be more fully explained in connection with Fig. 4.

It has been said that with the employment of two units, where lamps are connected in the work circuit a slight flicker will be noticeable. In this combination two impulses are obtained for each revolution of the contact devices. An increase in the speed of rotation would of course increase the frequency, but insufficient time would then be allowed for the lines of force to be built up by the field coils to their highest efficiency. In Fig. 4 I have shown an organization in which four units $A^{20}$, $A^{21}$, $A^{22}$, and $A^{23}$ are combined, giving four impulses for each revolution of the contact devices. Ample time is thus allowed for the building up of the lines of force in each unit, and the frequency of the electrical impulses delivered to the work circuit is such as to render the current practically continuous for the successful operation of motors and other apparatus, including incandescent lamps which show a steady light entirely free from flicker. I have also shown a combined condenser $K^6$ instead of separate condensers which might be employed for the field circuits, as before described. A single condenser $K^7$ is bridged across the work circuit, as before mentioned in connection with Fig. 3.

With the parts in the positions shown, the armature circuit of unit $A^{20}$ has been closed through wire 36, brush $c^{23}$, contact device $C^{23}$, wire 34, contact device $C^{20}$, brush $c^{20}$, work circuit W, and wire 37. The field circuit has been closed from battery $B^3$, brush $c^{26}$, contact device $C^{26}$, wire 35, contact device $C^{22}$, brush $c^{29}$, wire 38, and wire 39. When the contact devices begin their rotation, this latter circuit is broken at contact device $C^{22}$ and an impluse is delivered by unit $A^{20}$ to the work circuit over the armature circuit above traced. The magnetic lines of force had already commenced to build up in unit $A^{21}$ by the closure of its field circuit at contact device $C^{25}$ and brush $c^{30}$, through wire 40, and this is the exciting circuit which will be broken next. Contact device $C^{23}$ has now opened the armature circuit $A^{20}$, and contact device $C^{21}$, has closed the armature circuit of unit $A^{21}$ through wire 41 to work circuit in the opposite direction. When therefore the field circuit is now broken at contact device $C^{25}$ and brush $c^{30}$ an impulse in a direction opposite to that of the first impulse is sent to the work circuit.

In the meantime the field circuit of unit $A^{22}$ has been closed at contact device $C^{22}$ through brush $c^{22}$ and wire 42, and its armature circuit is closed by contact device $C^{23}$ and brush $c^{28}$ through wire 43 and wire 44 in the same direction as for the first impulse, and when the field circuit is now broken by contact device $C^{22}$ and brush $c^{22}$ an impulse is delivered to the work circuit in the same direction as the first impulse.

The field circuit of unit $A^{23}$ had already been closed by contact device $C^{25}$ and brush $c^{25}$ through wire 45, and the armature circuit of said unit is now closed by contact device $C^{21}$ and brush $c^{27}$ through wire 46. When, now, said field circuit is broken by contact device $C^{25}$ passing out of engagement with brush $c^{25}$, an impulse is sent to work circuit in a direction opposite to that of the preceding impulse.

An alternating current is thus delivered to the work circuit which has two complete cycles for each revolution of the contact devices, and may be represented by the curve shown in Fig. 5 of the drawings. In order to show the flexibility of the system, and its ready adjustment to suit different conditions, I will state that by changing the character or direction of winding of the coils, or their connections with the contact devices, or both, almost any form or kind of current may be obtained. For instance, by connecting wire 42 to brush $c^{30}$, wire 40 to brush $c^{22}$, wire 43 to brush $c^{21}$ and wire 41 to $c^{28}$, a compound curve such as shown in Fig. 6 may be obtained in which there are two impulses in the same direction, and then two impulses in the other direction, that is two above and two below the abscissa. By making suitable connections, which will be obvious, a current may be obtained in which all the impulses are in the same direction, as shown in Fig. 6a. This is the current also which is obtained by the apparatus and connections shown in Figs. 1 and 3, and when the frequency is sufficient this current is a continuous one for practical purposes.

I do not wish to confine myself or the scope of my invention to the exact forms or proportions of parts, or the details, of the apparatus herein shown, but contemplate all equivalents and modifications that would readily suggest themselves to those skilled in the art as falling within the scope of the invention. For instance, instead of the structures of the induction units hereinbefore shown and described many others may be employed, such as those shown in Figs. 7 to 14, those shown in Figs. 11 and 12 being preferable as fulfilling the ideal conditions.

It will also be understood that the contact devices shown in Figs. 1, 3 and 4 are supposed to be immersed in oil, as shown in Fig. 2, the oil being omitted from these diagrams to avoid complication of these drawings. It will be further understood that the various forms of cores and the methods of winding disclosed may be used in any other specific combinations than those shown. For instance, the connected field and armature coils shown in Fig. 3, or in fact a common coil used for both field and armature may be employed in the combinations shown in Figs. 1 and 4 instead of the separate coils. Also single or combined condensers may be employed in the various combinations.

While I have described my apparatus as arranged to deliver direct or pulsating and alternating currents, it is equally well adapted for the production of polyphase currents. By providing six transformer units and thirteen contact devices with the proper circuit connections, I obtain three-phase currents. In a similar manner, by increasing the number of transformer units, and making the proper electrical connections, polyphase currents of any desired number of phases may be produced.

An interesting phenomenon presented by my invention and which is claimed to be an advantageous feature is the fact that if the work circuit is short circuited no injurious effect to any part of the apparatus ensues. This results from the fact that the number of ampere turns in the armature circuit having been greatly increased by the short circuit the self-induction is consequently increased so as to practically neutralize or choke the original potential.

Under certain conditions, as for example, when a large output is desired with the consequent necessity of employing a large or varied amount of excitation for the fields or when a very rapid pulsation or wave variation is desired, an additional condenser may be bridged across the terminals of the field coil or coils in order to supplement the effect of the condenser across the break in the field circuit and also the condenser bridged across the armature circuit. Fig. 1 of the drawings shows such an arrangement where these supplementary condensers are designated as $k$ and $k^1$.

I claim:

1. In combination, a stationary core, the material of which forms a nearly complete magnetic circuit, a field coil wound on said core, an armature coil wound on said core, a source of exciting current for said field coil, a circuit changing device, and connections with said circuit changing device to break the armature circuit immediately before closing the field circuit and to close the armature circuit immediately before breaking the field circuit.

2. In combination, a stationary core, constituting a complete magnetic circuit of high and uniform permeability, material provided with one or more small gaps of low permeability material, a field coil wound on said core, an armature coil wound on said core, a source of exciting current for said field coil, a circuit changing device and connections with said circuit changing device to break the armature circuit immediately before closing the field circuit and to close the armature circuit immediately before breaking the field circuit.

3. In combination, a stationary core, constituting a complete magnetic circuit of high uniform permeability material, provided with one or more adjustable gaps, a field coil wound on said core, an armature coil wound on said core, a source of exciting current for said field coil, a circuit changing device, connections with said circuit changing device to break the armature circuit immediately before closing the field circuit and to close the armature circuit immediately before breaking the field circuit with all contacts immersed in oil, and a condenser connected across the break in the field circuit.

4. In combination, a stationary core the material of which forms a nearly complete magnetic circuit, a field coil wound on said core, an armature coil wound on said core, a source of exciting current for said field coil, a circuit changing device, connections with said circuit changing device to break the armature circuit immediately before closing the field circuit and to close the armature circuit immediately before breaking the field circuit, and a condenser connected across the break in the field circuit of sufficient capacity to balance or neutralize the effects of self-induction in the coils.

5. In combination, a stationary core, the material of which forms a nearly complete magnetic circuit, a field coil wound on said core, an armature coil wound on said core, a source of exciting current for said field coil, a circuit changing device, connections with said circuit changing device to break the armature circuit immediately before closing the field circuit and to close the armature circuit immediately before breaking the field circuit, and a condenser connected across the break in the field circuit of sufficient capacity to balance or neutralize the effects of self-induction in the coils.

6. In combination, a stationary core, constituting a complete magnetic circuit of high and uniform permeability material, provided with one or more adjustable gaps, a field coil wound on said core, an armature coil wound on said core, a source of exciting current for said field coil, a circuit changing device, connections with said circuit changing device to break the armature circuit immediately before closing the field circuit and to close the armature circuit immediately before breaking the field circuit, and a condenser connected across the break in the field circuit of sufficient capacity to balance or neutralize the effects of self-induction in the coils.

7. In combination, a stationary core the material of which forms a nearly complete magnetic circuit, a field coil wound on said core, an armature coil wound on said core, a source of exciting current for said field coil, a circuit changing device, connections with said circuit changing device to break the armature circuit immediately before closing the field circuit and to close the armature circuit immediately before breaking the field circuit, and condensers bridged across the break and terminals respectively of the field coil of sufficient capacity to balance or neutralize the effects of self-induction in the coils.

8. In combination, a stationary core, constituting a complete magnetic circuit of high and uniform permeability material, provided with one or more adjustable gaps, a field coil wound on said core, an armature coil wound on said core, a source of exciting current for said field coil, a circuit changing device, connections with said circuit changing device to break the armature circuit immediately before closing the field circuit and to close the armature circuit immediately before breaking the field circuit, and condensers bridged across the break and terminals respectively of the field coil of sufficient capacity to balance or neutralize the effects of self-induction in the coils.

9. The combination for producing electrical impulses comprising a plurality of units, each unit consisting of a stationary core, the material of which forms a nearly complete magnetic circuit, a field coil wound on said core, an armature coil wound on said core, a source of exciting current for said field coil, a work circuit, circuit changing devices, and connections with said circuit changing devices to break the armature circuit immediately before closing the field circuit and to close the armature circuit immediately before breaking the field circuit, and to send the impulses produced in the armature circuit of each unit in rapid succession to the work circuit.

10. The combination for producing electrical impulses comprising a plurality of units, each unit consisting of a stationary core constituting a complete magnetic circuit of high and uniform permeability material, provided with one or more gaps, a field coil wound on said core, an armature coil wound on said core, a work circuit, a source of exciting current for said field coil, circuit changing devices, connections with said circuit changing devices to break the armature circuit immediately before closing the field circuit and to close the armature circuit immediately before breaking the field circuit, and to send the impulses produced by each unit in rapid succession into the work circuit, and a condenser connected across the break in the field circuit of sufficient capacity to balance or neutralize the effects of self-induction in the coils.

11. The combination for producing electrical impulses, comprising a plurality of units, each unit consisting of a stationary core constituting a complete magnetic circuit of high and uniform permeability material, provided with one or more gaps, a field coil wound on said core, an armature coil wound on said core, a work circuit, a source of exciting current for said field coil, circuit changing devices with all contacts immersed in oil, connections with said circuit changing devices to break the armature circuit immediately before closing the field circuit and to close the armature circuit immediately before breaking the field circuit, and to send the impulses produced by each unit in rapid succession into the work circuit, and a condenser bridged across the break in the armature circuit of sufficient capacity to balance or neutralize the effects of self-induction in the coils and the inductance of the load.

12. A combination for producing electrical impulses, comprising a stationary core constituting a complete magnetic circuit of high and uniform permeability material, provided with one or more gaps, a field coil wound on said core, an armature coil wound on said core, a work circuit, a source of exciting current for said field coil to build up lines of force, and means for causing said lines of force to contract rapidly to zero through the armature coil.

13. A combination for producing electrical impulses, comprising a plurality of units, each unit consisting of a stationary core of high and uniform permeability material, provided with one or more gaps, a field coil wound on said core, an armature coil wound on said core, a source of exciting current for said field coil, a work circuit, circuit changing devices and connections with said circuit changing devices to break the armature circuit immediately before closing the field circuit and to close the armature circuit immediately before breaking the field circuit, and a single condenser connected to be bridged across the break in each field circuit.

14. A combination for producing electrical impulses, comprising a plurality of units, each unit consisting of a stationary core of high and uniform permeability material, provided with one or more gaps, a field coil wound on said core, an armature coil wound on said core, a source of exciting current for said field coil, a common work circuit, circuit changing devices, and connections with said circuit changing devices to break the armature circuit immediately before closing the field circuit and to close the armature circuit immediately before breaking the field circuit and to send impulses in rapid succession into the work circuit, and a condenser bridged across the break in the field circuit of sufficient capacity to extinguish the arc and neutralize the effects of self-induction in the coils.

In testimony whereof I have hereunto set my hand in the presence of two subscribing witnesses.

GEORGE H. SETHMAN.

Witnesses:
GEORGE D. INGRAM,
JAMES H. MARR.

Copies of this patent may be obtained for five cents each, by addressing the "Commissioner of Patents, Washington, D. C."